Jan. 22, 1946.  O. J. POUPITCH  2,393,564
SHEAR PROOF RIVET
Filed April 8, 1944

INVENTOR.
Ougljesa Jules Poupitch
By: Loftus, Moore, Olson & Trexler
attys.

Patented Jan. 22, 1946

2,393,564

UNITED STATES PATENT OFFICE 2,393,564

SHEARPROOF RIVET

Ougljesa Jules Poupitch, Chicago, Ill., assignor to Illinois Tool Works, Chicago, Ill., a corporation of Illinois Application April 8, 1944, Serial No. 530,161

6 Claims. (Cl. 85—37)

This invention relates generally to rivets, and more particularly to rivets capable of withstanding relatively high shear and tensile stresses, and having a diameter which does not exceed certain limiting requirements.

There are many instances requiring the use of rivets which must withstand very high shear stresses and yet the nature of the work is such as to prohibit the use of relatively large holes for accommodating rivets. It has been found practical in such instances to employ rivet structures composed of two parts, one part being relatively hard to withstand shear stresses and the other relatively soft to facilitate upsetting of the material in the riveting operation. When rivets are subjected to high shear stress axial stress in tension also results. While it is of the utmost importance under the aforementioned circumstances to provide rivets which will withstand high shear stresses, it is equally important that the two parts of the rivet resist axial stress in tension. It is, therefore, an important object of the present invention to provide a rivet structure which will withstand high shear stresses and also axial stresses tending to separate the rivet parts. To this end the invention contemplates a two part rivet structure wherein one of the parts is made of relatively hard material such as steel and the other part firmly interlocked therewith is made of relatively soft deformable material such as an aluminum alloy. These parts are firmly secured together so as to provide a unitary rivet structure which in external appearance resembles a conventional one piece rivet.

More specifically, the present invention contemplates telescopically associated rivet body portions which are positively interlocked together as a unit to withstand stresses tending to separate them when in use, the softer material projecting beyond the end of the harder body portion to present an entering extremity adapted to be formed into a rivet head by upsetting.

It is a further object of the present invention to provide a rivet structure of extremely simple and practical construction which may be produced with the utmost economy.

Figure 1:
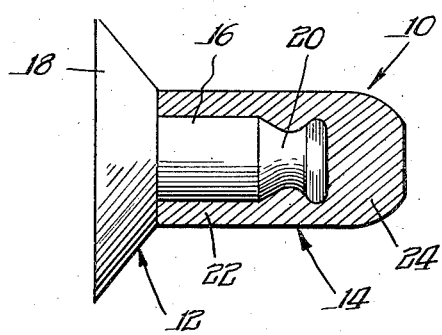

The foregoing and other objects and advantages will be more apparent from the following detailed description when considered in connection with the accompanying drawing wherein:

Figure 1 is a side view of a rivet structure contemplated by the present invention, the inner relatively hard portion thereof being shown in elevation and the outer relatively soft deformable part being shown in section.

Figure 2:
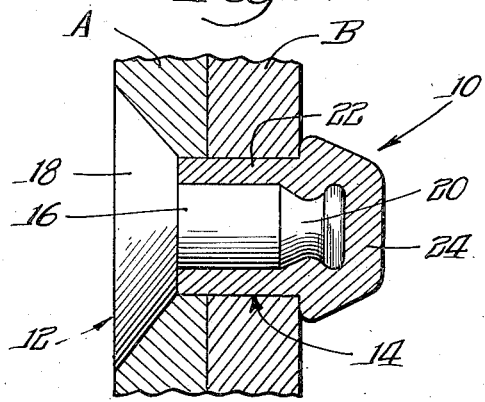

Figure 2 discloses the rivet structure of Figure 1 after it has been upset to secure two plates together.

Figure 3:
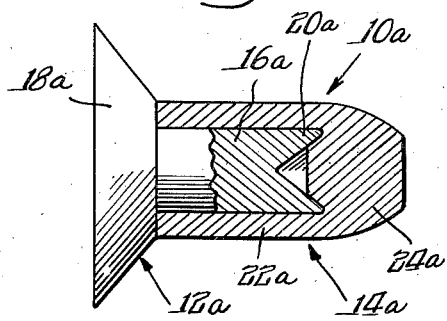

Figure 3 is a view similar to Figure 1 disclosing a modified structure wherein the relatively hard body portion is provided with an extremity capable of being laterally deflected during the upsetting operation, thereby providing an effective interlock to resist tensile stresses tending to separate the two rivet parts.

Figure 4:
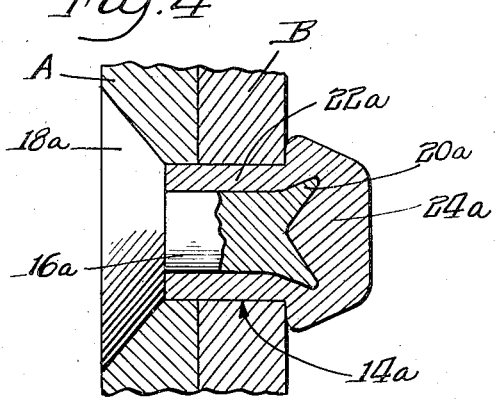

Figure 4 discloses the rivet of Figure 3 in operative association with two plates.

Figure 5:
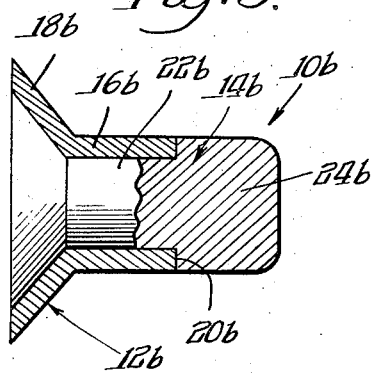
Figure 6:
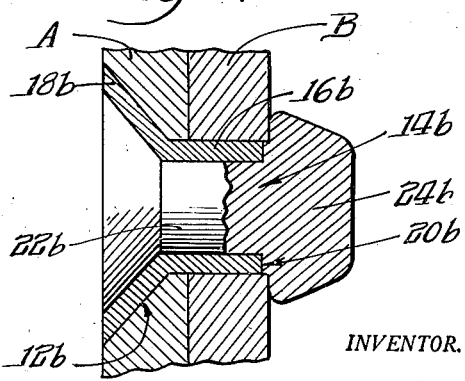

Figure 5 is a view similar to Figures 1 and 3 disclosing a still further modification wherein the outer body portion provides a relatively hard sleeve for accommodating the inner softer material, said parts being interlocked against forces tending to axially separate them; and Figure 6 is a sectional view similar to Figures 2 and 4 disclosing the rivet of Figure 5 securing a pair of plates together.

Referring now to the drawing more in detail wherein like numerals have been employed to designate similar parts throughout the various views, it will be seen that Figures 1 and 2 disclose a rivet structure designated generally by the numeral 10. This rivet structure 10 includes one part 12 made of relatively hard material, such as steel, and a part 14 made of relatively soft deformable material as, for example, an aluminum alloy. The part 12 includes a body portion 16 which is flared or enlarged at one extremity to provide a rivet head portion 18. The extremity of the body 16, opposite from the head 18, is provided with an annular groove or recess 20, as clearly shown in Figure 1.

The part 14 also includes a body portion 22 which is complementary to the body portion 16 of the part 12, said parts being telescopically associated with each other. When the parts are associated with each other the softer material of the part 14 is forced into the annular recess 20 so as to provide an effective interlock between the two parts. The part 14 extends sufficiently beyond the extremity of the body 16 to present an entering deformable portion 24. After the two part rivet structure has been inserted through a pair of plates A and B, the extending or deformable portion 24 may be formed into a rivet head as illustrated in Figure 2. The upsetting of the deformable extension 24 not only enlarges the rivet structure to provide a head, but also enables the body portion 22 to experience a tendency to expand sufficiently in diameter. This insures a very snug fit within the registering apertures of the plates A—B. The presence of the relatively hard inner core or body portion 16 serves to effectively resist shearing stresses, and the interlock between the body 16 and the body 22 serves to positively resist tensile stresses tending to axially separate the two parts of the rivet.

In Figure 3 a slightly modified rivet structure is shown which is designated generally by the numeral 10a. The rivet structure 10a includes a part 12a of hard material and a part 14a of soft deformable material. The part 12a includes a body portion 16a which is flared or enlarged at its outer extremity to provide a rivet head section 18a. The extremity of the body 16a opposite from the head 18a is provided with an interlocking section 20a. This interlocking section 20a is formed as a result of a countersink or recess within the body 16a. The countersinking of the body 16a results in the presence of an annular section of stock which will be deflected outwardly to the position shown in Figure 4 during the riveting operation.

The part 14a includes a body portion 22a complementary to the body portion 16a of the part 12a. A portion of the relatively soft material of the body 22a extends sufficiently beyond the extremity of the body 16a to present an entering deformable portion 24a. After the rivet structure 10a has been inserted through the plates A—B, the extension 24a may be upset to provide a rivet head as clearly illustrated in Figure 4. During this upsetting operation the interlocking sections 20a are forced outwardly and thus cooperate in securing the parts against axial separation. These axial stresses frequently result when tendencies of the work plates to shift causes the rivet body to experience both shear and tensile stresses.

Figure 5 discloses still another modification of the invention designated generally by the numeral 10b. This rivet structure 10b includes a part 12b made of relatively hard material and a part 14b made of relatively soft deformable material. The part 12b includes a body portion 16b which is flared or enlarged at one extremity to provide a rivet head portion 18b. The opposite extremity of the body 16b provides an end abutment surface 20b which cooperates or interlocks with the part 14b. Part 14b includes a body portion 22b complementary to the harder body portion 16b, and these parts, similarly to the parts previously described, are telescopically associated with each other. As the parts are associated with each other a portion 24b extending beyond the body 16b is enlarged sufficiently to interlock with or bear against the abutment surface 20b. The left extremity of the part 14b, Figure 5, is enlarged so as to provide a head portion which cooperates with the head portion 18b in preventing relative movement between the parts in given opposite directions. The engagement of the extended portion 24b with the abutment surface 20b secures against relative movement of the parts in the opposite direction. After the rivet structure 10 has been inserted within complementary apertures of plates A and B, the extended portion 24b may be upset to provide a rivet head as clearly illustrated in Figure 6. In instances where it is desirable to have the hardened part in direct contact with the plates, the structure of Figures 5 and 6 may be employed. In instances where this direct contact is not essential and it is desired to effect snug tight fitting direct engagement between the softer material and the plates, the structure shown in Figures 1 to 4 is preferable. However, in all of the disclosed modifications a two part construction is presented wherein means is provided which is adapted to interlock the two parts together to insure against separation resulting from stress in tension. Also, all of the modifications employ a deformable section extending beyond the extremity of the hard body portion which may be conveniently formed into a rivet head during the setting operation.

From the foregoing it will be apparent that the invention contemplates a rivet structure of extremely practical and simple form. The rivet structure in appearance simulates conventional rivets and hence is as conveniently insertable within registering apertures as a conventional rivet. The external periphery is smooth, and the entering end is preferably beveled to facilitate the ease of initial insertion. The rivet contemplated by the present invention has a very practical application in instances where the plates to be secured together will not withstand pressures normally required to upset steel rivets. The rivet described herein provides a relatively soft deformable portion and hence reduces the force required to set the rivet. By employing a relatively hard part the strength of the rivet is insured without any appreciable increase in diameter. That is to say, if the rivet in its entirety were to be made of relatively soft deformable material, the diameter of the rivet shank would have to be considerably larger and hence would render it impractical for use in many instances where the size of rivet holes must be kept to a minimum.

Obviously the invention is not limited to the specific structural details disclosed herein, but is capable of other modifications and changes without departing from the spirit and scope of the appended claims.

The invention is hereby claimed as follows:

1. A unitary rivet structure comprising two interlocked parts, one part being relatively hard and including a body portion flared at one extremity to provide a rivet head portion, a second part having a body portion complementary to and telescopically associated with the first mentioned body portion, said second part having a relatively soft portion extending sufficiently beyond the end of the body portion of the first part opposite from the flared extremity thereof to present an entering extremity which is adapted to be formed into a rivet head by upsetting, and means for positively interlocking said parts together as a unit to withstand tensile stresses tending to separate them when in use.

2. A unitary rivet structure comprising two interlocked parts, one part being relatively hard and including a body portion flared at one extremity to provide a rivet head portion, a second part having a body portion complementary to and telescopically associated with the first mentioned body portion, said second part having a relatively soft portion extending sufficiently beyond the end of the body portion of the first part opposite from the flared exteremity thereof to present an entering extremity which is adapted to be formed into a rivet head by upsetting, and means for positively interlocking said parts together as a unit to withstand tensile stresses tending to separate them when in use, said interlocking means including a section of the innermost part in the vicinity of said relatively soft extending portion for interlocking with the material of the second part.

3. A unitary rivet structure comprising two interlocked parts, one part being relatively hard and including a body portion flared at one extremity to provide a rivet head portion, a second part having a body portion complementary to and telescopically associated with the first mentioned body portion, said second part having a relatively soft portion extending sufficiently beyond the end of the body portion of the first part opposite from the flared extremity thereof to present an entering extremity which is adapted to be formed into a rivet head by upsetting, and means for positively interlocking said parts together as a unit to withstand tensile stresses tending to separate them when in use, said interlocking means including a head of the internal body portion at one extremity and an interlocking section at the opposite extremity of said internal body portion.

4. A unitary rivet structure comprising two interlocked parts, one part being relatively hard and including a body portion flared at one extremity to provide a rivet head portion, a second part having a body portion complementary to and telescopically associated with the first mentioned body portion, said second part having a relatively soft portion extending sufficiently beyond the end of the body portion of the first part opposite from the flared extremity thereof to present an entering extremity which is adapted to be formed into a rivet head by upsetting, and means for positively interlocking said parts together as a unit to withstand tensile stresses tending to separate them when in use, said interlocking means including a recess in one of the parts and a complementary projection in the other part in the vicinity of said relatively soft extending portion.

5. A unitary rivet structure comprising two interlocked parts, one part being relatively hard and including a body portion flared at one extremity to provide a rivet head portion, a second part having a body portion complementary to and telescopically associated with the first mentioned body portion, said second part having a relatively soft portion extending sufficiently beyond the end of the body portion of the first part opposite from the flared extremity thereof to present an entering extremity which is adapted to be formed into a rivet head by upsetting, and means for positively interlocking said parts together as a unit to withstand tensile stresses tending to separate them when in use, said interlocking means including a relatively hard internal section which is capable of being laterally deflected during the upsetting of said entering extremity to facilitate interlocking of the aforesaid rivet parts.

6. A unitary rivet structure comprising two interlocked parts, one part comprising an internal body member of relatively hard material which is flared at one extremity to provide a rivet head portion, a second part having a sleeve-like body portion encircling the first mentioned body portion, said second part having a relatively soft portion extending sufficiently beyond the end of the body portion of the first part, opposite from the flared extremity thereof, to present an entering extremity which is adapted to be formed into a rivet head by upsetting, and means for positively interlocking said parts together as a unit to withstand tensile stresses tending to separate them when in use.

OUGLJESA JULES POUPITCH.